Aug. 16, 1966 R. G. BRADEEN 3,266,790
CUSHIONING MEDIA
Filed July 14, 1961
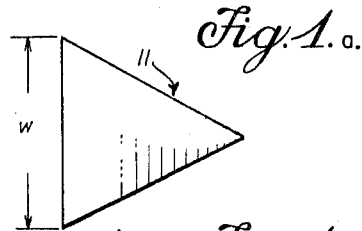
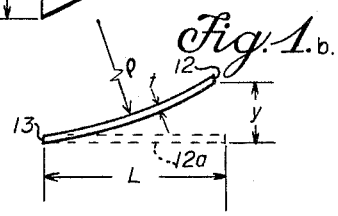
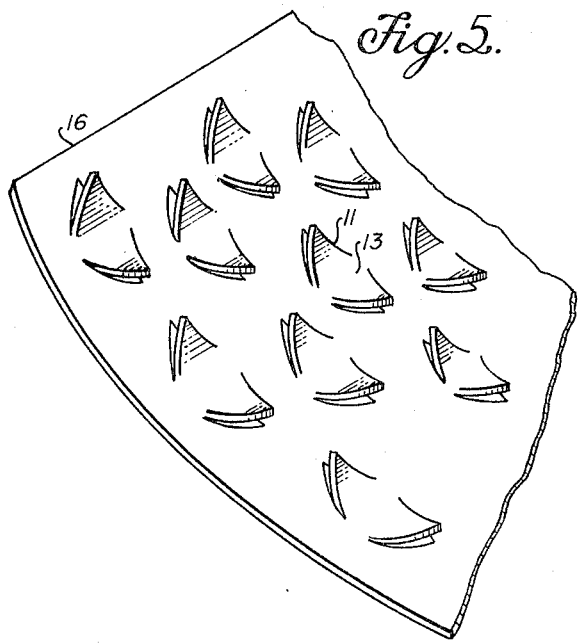
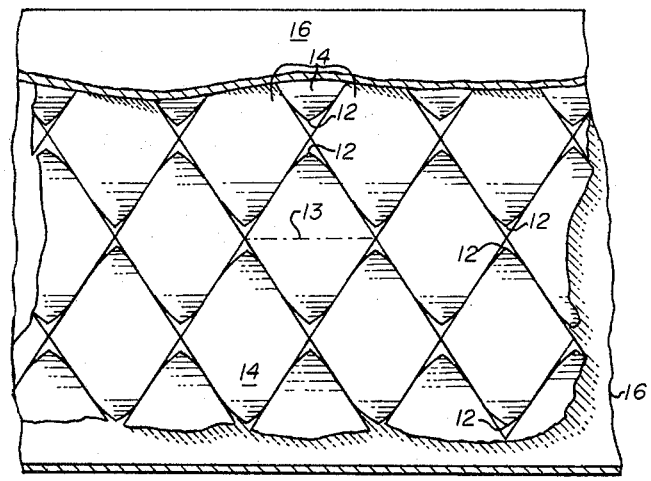
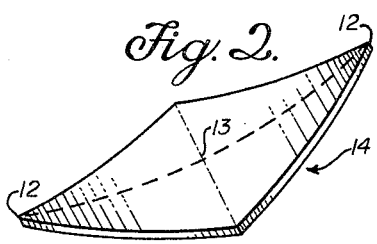
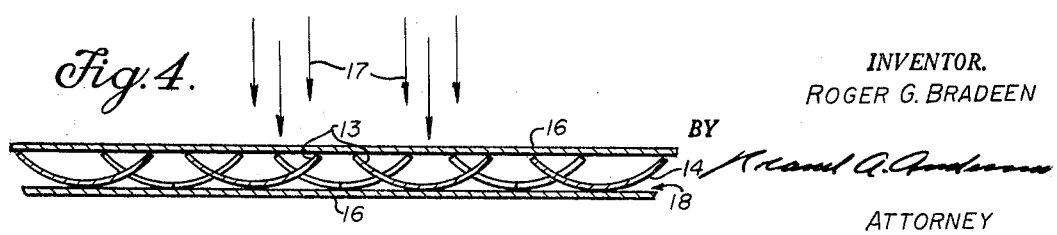
INVENTOR.
ROGER G. BRADEEN
ATTORNEY

United States Patent Office 3,266,790
Patented August 16, 1966

3,266,790
CUSHIONING MEDIA
Roger G. Bradeen, Castro Valley, Calif., assignor to the United States of America as represented by the United States Atomic Energy Commission
Filed July 14, 1961, Ser. No. 124,243
4 Claims. (Cl. 267—1)

The invention herein described was made in the course of, or under, Contract W–7405–ENG–48 with the United States Atomic Energy Commission.

The present invention relates to cushioning media and, more particularly, to cushioning media constructed of a plurality of thin, resilient, flexed members.

In general, a cushioning material provides a medium for absorbing stresses which would otherwise have to be absorbed by structures less able to absorb stresses without experiencing damage. The general characteristics of a cushioning material which enables it to withstand damage from applied stress, is its ability to deform elastically. Thus, a measure of quality of a cushioning material is the magnitude of stress that can be experienced before the material deforms inelastically. Another important measure of quality of a cushioning material is the amount of energy per area that it can absorb.

The requirements of cushioning media are generally fulfilled by the use of continuous masses of organic substances, such as rubber. Such media are used for shoe soles, automobile tires, rocketship instrument packaging, etc. Although organic cushioning media, as known in the art, have proven satisfactory for a great majority of needs, they have been unsatisfactory in meeting the requirements for certain conditions for which the present invention provides a much improved substitute.

In cases where cushioning media must accurately retain their characteristics over an extended period of time, known organic media tend to deteriorate and fail. Where cushioning media must be able to accurately maintain their characteristics after being deflected repeatedly, known organic media prove deficient. Where cushioning media must be able to accurately maintain their characteristics while exposed to temperature variations, known organic cushioning materials are often unsatisfactory. But, by far, the greatest single disadvantage of known organic cushioning media is the inability to accurately design such media to have characteristics which are predictable prior to fabrication. The chemistry involved in organic cushioning media has not advanced to the point where the requirements of a given situation can accurately determine a theoretical design for a cushioning medium which can be obtained from that design. It is the practice of the art to obtain a cushioning medium by methods which are basically trial and error. Because of the relative inability to control the characteristics of an organic medium by controlling the amount or manner in which the chemical constituents are provided, it is a common occurrence to obtain a material which possesses one of a number of desirable characteristics, but at the same time not possess the others. When an attempt is made to redesign the material to possess those other characteristics, the results often include the loss of the desirable characteristic initially achieved. Thus, as is now the state of the art, the design of cushioning material is at most an empirical process. The advantages of a material which can be accurately predesigned on theoretical bases, and which contains all of the desired characteristics needed for a given situation, are so obvious as not to require citation.

The present invention provides a cushioning medium which maintains its characteristics for long periods of time, after great numbers of deformations, and through continual exposure to the atmosphere and temperature variation. These desirable characteristics are a result of the fact that in its preferred embodiment, the present invention does not use organic materials. Certain semi-rigid, organic materials, such as plastics and the like, can be used, however, without the loss of the desirable characteristics pointed out supra. The medium provided by the present invention has the added characteristics of being capable of very accurate design based upon theoretical criterion, and which can provide a cushioning medium having a wide variety of characteristics. Where it is desirable to have a cushioning medium which is reliable and designable, such as in the packaging of delicate electronic equipment which must experience large accelerations as in a rocket, the present invention provides a cushioning medium the quality of which is unobtainable with organic materials.

Accordingly, it is an object of the present invention to provide an effective cushioning medium.

It is another object of the present invention to provide a cushioning medium which has characteristics that can be theoretically predetermined.

It is still another object of the present invention to provide a cushioning material which maintains its characteristics after long use and exposure to atmospheric conditions.

It is yet another object of the present invention to provide inorganic cushioning material of superior quality.

In the drawings, FIGURE 1a is a plan view of a basic flexile element of the cushioning material, and FIGURE 1b is a side elevation thereof;

FIGURE 2 is an isometric illustration of a compound flexile element of the cushioning medium of the present invention;

FIGURE 3 is an illustration of the arrangement of basic flexile elements of FIGURE 2 to provide a cushioning medium; and FIGURE 4 is a cross-sectional view illustrating the use of the cushioning medium of the present invention in a sandwich-type structure.

FIGURE 5 is an isometric view showing a cushioning medium formed by stamping.

Referring now to FIGURE 1a, a thin, resilient, flexed clip 11 having isosceles triangular geometry serves as the basic unit of the cushioning media of the present invention. The clip is most advantageously metallic, but plastics are equally satisfactory for some uses. The triangular geometry of clip 11 represents the ideal form for efficiently absorbing energy when used in the manner taught by the present invention. FIGURE 1b shows clip 11 to have a constant radius of curvature along its height. The load to be cushioned is applied to end 12 of clip 11, while edge 13 is firmly anchored. A study of the forces involved when a load is applied to end 12 leads one to cantilever beam analysis, and particularly to the analysis of beams which are prestrained. This analysis shows that the triangular geometry assures that every element of the clip, at a constant distance from the surface, absorbs the same amount of energy as every other element at that distance from the surface, and thus provides the most efficient geometry for energy absorption. Dotted lines 12a represent clip 11 in its depressed, flat state, which is generally the extreme limit of deformation for the clip. When the position of 12a is the limit of deformation due to a backing material acting as a stop, clip 11 is seen to have the desirable characteristic of being "overload proof."

The variables involved in designing a cushioning medium having clips 11 as its basic unit, can be seen with references to FIGURES 1a and 1b. By the correct choice of clip material, length L, width W, radius of aperture $\rho$, deflection distance y, and thickness t, cushioning needs of all kinds can be successfully met. The following equations contain all of the necessary relationships between the above-mentioned variables to allow for accurate designing:

$$y_{max.} = \frac{\sigma L^2}{Et} \quad (1)$$

where, $y_{max.}$ is the vertical distance of end 12 above edge 13 when no load is present at end 12; $\sigma$ is the stress designed for; and, E is the modulus of elasticity of the material from which the clip 11 is made;

$$\rho = \frac{Et}{2\sigma} \quad (2)$$

for an unloaded clip; and $$P_{max.} = \frac{\sigma t^2}{3L^2} \quad (3)$$

where $P_{max.}$ is the maximum allowable pressure that the cushion can exert without damaging the load (clips fully flattened).

How these three formulae are used is best described by way of the following example:

Let it be desired to design a cushion which will exert a pressure of 20 p.s.i. when compressed to a y of .016", and a pressure of 5 p.s.i. when compressed to a y of .045". Let it also be designed to have a minimum of mass. Titanium alloy B-120 VCA is chosen as the clip material due to its outstanding ability to absorb energy. For this material, the modulus of elasticity E is $14.2 \times 10^6$ p.s.i., and the design stress $\sigma$ is 139,000 p.s.i.

By plotting deflection-versus-pressure as a straight line through the two values given above, $y_{max.}$ is determined as .051". Equating (1) and (3) above gives the relationship for thickness t, as $$t = \frac{y_{max.} \cdot P_{max.} \cdot 3E}{(\sigma)^2} \quad (4)$$

which has a value of .00312 for the values of the example. Knowing t allows Equation 3 to be solved for L, which is thus determined to be .1292". Equation 2 now may be solved to give a radius of curvature $\rho$ of .1642". The final step determines the width W by choosing a ratio W/L of 1.375 (this is not a necessary ratio, but one that gives good results for covering most surface geometries). This gives a W of .1775". Thus, an unloaded clip is designed to be made of B-120 VCA titanium alloy of a thickness of .00312", width of .1775", length of .1292", and radius of curvature of .1642". This clip will follow the deflection curve desired within 5% when the clips are accurately manufactured, and possibly within 1%. This clip will retain its characteristics to within 1% over a five-year period, and can offer more cushioning per inch of deflection than organic material, if this characteristic is desired.

It is obvious that one single clip 11, no matter how accurately designed, cannot alone serve very well as a cushioning medium. The invention resides in utilizing a plurality of clips 11 to cover an area over which cushioning is desired. There are numerous arrangements that are possible for any single requirement and an endless number of patterns in which the clips can be arranged.

One basic extension of the basic clip 11, however, that applies no matter what the arrangement used, pertains to the means for securing edge 13 (FIGURE 1b) so that clip 11 will react as designed. Although welding or riveting are means for securing end 13, often these methods are expensive or otherwise undesirable. To overcome this, clips 11 are made in integral pairs 14 having a common base 13, as shown in FIGURE 2. The rhombus-shaped clip 14 then becomes the basic unit of the cushioning material. The same design characteristics are retained, and only the dimension L need be changed to 2L; all others remain fixed. When equal loads appear at ends 12, base 13 is securely fixed without any additional structure or special adhesive. The deflection of clip 14 is as though base 13 were anchored in an ideal manner. Thus, the designed-for characteristics are accurately achieved. Since the clips are relatively small, it is not unnatural for ends 12 of a single clip to receive the same, or nearly the same, load, thus making the rhombic design practical.

The rhombic design of clips 14 allows maximum energy absorption per mass of material, as well as per area of clip. It also allows maximum energy absorption per area for an area large compared to that of the clip.

FIGURE 3 illustrates the arrangement of clips 14 which furnishes the maximum attainable energy absorption per area utilizing the clips of the invention. Basically, clips 14 are arranged so as to form a continuous sheet of material when completely deflected. By such an arrangement, every element of area to be cushioned contains cushioning medium, with no voids. This is accomplished by securing a plurality of clips 14 to a backing material 16 such that the extremities of the base lines 12 of each clip are in contact with the extremity of the base line of a neighboring clip, and ends 12 of adjacent clips meet when they are fully flattened. When clips 14 are in this arrangement, and all of the clips are of the same design, the area to be cushioned will be most advantageously covered for energy absorption and the cushioning medium formed will have the characteristics of each individual clip 14. Thus, in fabricating an entire medium, only a single clip need be designed.

The composition of backing material 16 depends to a great extent upon the use intended for the cushioning. A single sheet of material 16 to which clips 14 are affixed may be all that is necessary if points 12 will not damage the load. A second sheet of material 16, however, can be placed over points 12 if the load is such as would be affected thereby. Material 16 can be rigid or flexible, flat or curved, etc. Backing materials of metal, plastic, wood, or heavy paper, to name a few, have been found satisfactory.

Just as the material 16 can be varied, depending upon the use for which the material is to be used, so can the manner of affixing clips 14 to the material. If forces 17, as shown in FIGURE 4, are generally normal to material 16, the tendency for clips 14 to move laterally will be small, or negligible. In such cases, it is only necessary to provide a slightly adhesive material to the base of each clip (as by having lower material 16 covered on surface 18 with adhesive). If, however, there are going to be tangential forces tending to dislodge clips 14 from their original positions, it may be necessary to use more rigid securing means, such as rivets.

FIGURE 4 shows how clips 14 can be arranged to provide an effective cushioning medium which is extremely thin, yet having all of the other advantages of an inorganic material. Other arrangements of clips 14, as shown in FIGURE 3 or single-layered as in FIGURE 4, are also suitable. It is not even necessary to enjoy the advantages of the present invention that triangular clips 11 be constructed to form rhomboidal clips 14. Any use of a plurality of triangularly-shaped, prestressed, metal clips as a cushioning medium falls well within the spirit of the present invention.

One example of an advantageous embodiment of the present invention not utilizing rhomboidal clips 14 is shown in FIGURE 5 where triangular clips 11 are integrally connected along their bases 13 to the backing material 16 by being stamped therefrom. Thus, a sheet of material 16 is stamped in such a manner that a plurality of generally triangular-shaped flexile members 11 extend above the surface of the material 16 and together form a resilient area for cushioning. By stamping the members 11 from the backing sheet 16 itself and leaving the bases 13 integrally connected, an excellent base connection is achieved which makes the design criteria valid.

The clips 11 of the present invention have been described as being triangles (which are isosceles) and as having radii of curvature $\rho$ along their height, which are constant. Clips 11, so designed, will provide the most advantageous basic unit for the great majority of cushioning needs. There are, however, a number of conditions, most advantageously met with the use of clips 11, which are of other than triangular geometry (i.e., rectangles, circles, etc.) and have radii of curvature which are functions of distance rather than constant (i.e., exponential). Where it is desired that the deflection follow other than a straight-line relationship with the stress, variation of the radius of curvature can achieve a particular functional relationship for stress-versus-deflection. Where it is desirable to have a load supported by structure other than a number of points 12 of clips 11, the clips can be modified to have rounded or squared ends, depending upon the need to be fulfilled.

Thus, it can be generally stated that numerous variations from the design of clip 11, as shown in FIGURES 1a and 1b, are contemplated by the present invention.

What is claimed is:

1. A medium for cushioning a load exerting a pressure ranging from a maximum, of $P_{max.}$, to a minimum per unit area, comprising in combination:

(a) a backing material having a substantially uniform surface adapted to support the pressure of said load; and (b) a plurality of similar curved, resilient material, flexed members, one each of said members disposed in each unit area of said backing material surface which supports said load; said member being generally shaped as an isosceles triangle having two equal sides and a base of width, W; each of said members having a generally constant radius of curvature, $\rho$, along a perpendicular line, of length L, from said base to the apex juncture of said two equal sides; the base of each of said members disposed in fixed contiguous relation to said surface, with the curved portion having a surface extending in facing convex spaced relation to said surface, with said apex disposed an unflexed distance, $y_{max.}$, outwardly from said surface wherefor said convex surface progressively contacts said backing material under increasing load pressure; said members having a thickness $t$ determined by the relation $$t = \frac{Y_{max.} P_{max.} 3E}{(\sigma)^2}$$

wherein E is the modulus of elasticity of said material and $\sigma$ is the design stress of said material; said members having a length L determined by the relation, $$P_{max.} = \frac{\sigma t^2}{3L^2}$$

and said members having a radius of curvature $$\rho = \frac{Et}{2\sigma}$$

2. A cushioning medium as defined in claim 1, wherein said flexed members are in the form of isosceles triangles paired base to base, to provide a rhombus configuration, and said dimension, L, is correlatively changed to 2L.

3. A cushioning medium as defined in claim 2, wherein said members are metallic members and wherein said members are secured to said backing material surface in fixed relation along the line of said paired bases.

4. A cushioning medium as defined in claim 1, wherein said backing material is a thin flexible metallic sheet and said flexed members comprise curved isosceles triangular portions punched from said sheet of backing material; said triangular members having the bases in parallel paired relationship across an intervening portion of said sheet.

References Cited by the Examiner

UNITED STATES PATENTS

| 119,129 | 9/1871 | Elliot | 267—3 |
| 495,218 | 4/1893 | Coe. | |
| 1,917,926 | 7/1933 | Decker | 267—1 |
| 1,925,917 | 9/1933 | Chalon | 154—52.1 |
| 2,697,832 | 12/1954 | Stich | 154—46 |
| 2,733,177 | 1/1956 | Meyer | 154—52.5 |
| 2,768,919 | 10/1956 | Bjorksten et al. | 154—52.5 |
| 3,002,740 | 10/1961 | Hulst | 267—1 |

EARL M. BERGERT, *Primary Examiner.*

J. P. MELOCHE, *Assistant Examiner.*